(12) United States Patent
Ekholm et al.

(10) Patent No.: US 11,201,458 B2
(45) Date of Patent: Dec. 14, 2021

(54) JOINT, TERMINATION OR CROSS-CONNECTION ARRANGEMENT FOR A CABLE AND METHOD FOR PROVIDING A JOINT, TERMINATION OR CROSS-CONNECTION ARRANGEMENT

(71) Applicant: NKT HV Cables AB, Lyckeby (SE)

(72) Inventors: Henrik Ekholm, Listerby (SE); Johan Jäderberg, Lyckeby (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 16/301,068

(22) PCT Filed: May 13, 2016

(86) PCT No.: PCT/EP2016/060878
§ 371 (c)(1),
(2) Date: Nov. 13, 2018

(87) PCT Pub. No.: WO2017/194165
PCT Pub. Date: Nov. 16, 2017

(65) Prior Publication Data
US 2019/0190245 A1 Jun. 20, 2019

(51) Int. Cl.
*H02G 15/105* (2006.01)
*H02G 1/10* (2006.01)
(Continued)

(52) U.S. Cl.
CPC ............ *H02G 15/105* (2013.01); *H02G 1/10* (2013.01); *H02G 15/117* (2013.01); *H02G 15/14* (2013.01)

(58) Field of Classification Search
None
See application file for complete search history.

(56) References Cited

U.S. PATENT DOCUMENTS 1,647,669 A * 11/1927 Sipe ................... E21B 10/32
175/286
1,740,367 A * 12/1929 Newton ................ H02G 15/10
174/75 R
(Continued)

FOREIGN PATENT DOCUMENTS

EP         0003959 A2 * 12/1978 .............. F16L 47/00
EP          499060 A2 *  1/1992 .............. H01R 4/70
(Continued)

OTHER PUBLICATIONS

International Preliminary Report on Patentability Application No. PCT/EP2016/060878 Completed: Aug. 17, 2018; dated Aug. 17, 2018 23 pages.
(Continued)

*Primary Examiner* — Timothy J. Dole
*Assistant Examiner* — Muhammed Azam
(74) *Attorney, Agent, or Firm* — Whitmyer IP Group LLC

(57) ABSTRACT

A joint, termination or cross-connection arrangement for a cable includes a first cable and a protective casing. The arrangement further includes a transition sleeve. The transition sleeve, at a first longitudinal end surface thereof, is welded to the metallic sheath of the first cable around the whole circumference of the metallic sheath. The transition sleeve is furthermore welded to the protective casing around the whole circumference of the transition sleeve. A method of providing such an arrangement includes: welding the transition sleeve, at the first longitudinal end surface, to the metallic sheath of the first cable around the whole circumference of the metallic sheath; and welding the transition sleeve to a first tubular end portion of the protective casing around the whole circumference of the transition sleeve.

15 Claims, 4 Drawing Sheets

(51) Int. Cl.
*H02G 15/117* (2006.01)
*H02G 15/14* (2006.01)

(56) References Cited

U.S. PATENT DOCUMENTS

| | | | | |
|---|---|---|---|---|
| 2,186,038 A * | 1/1940 | Peters | | 313/11.5 |
| 2,676,197 A * | 4/1954 | Read, Jr. | | H01J 5/42 |
| | | | | 174/23 R |
| 3,125,698 A * | 3/1964 | Persson | | C04B 37/026 |
| | | | | 313/634 |
| 3,210,460 A * | 10/1965 | Suelmann | | H02G 15/068 |
| | | | | 174/73.1 |
| 3,356,788 A * | 12/1967 | Callahan | | H02G 15/103 |
| | | | | 174/73.1 |
| 3,446,741 A * | 5/1969 | Hervig | | H02G 15/064 |
| | | | | 523/223 |
| 3,557,301 A * | 1/1971 | Priaroggia | | H01B 7/201 |
| | | | | 174/102 D |
| 3,562,406 A * | 2/1971 | Uhlig | | H02G 15/14 |
| | | | | 174/74 R |
| 3,692,922 A * | 9/1972 | Sugimoto | | H02G 15/184 |
| | | | | 174/73.1 |
| 3,717,717 A * | 2/1973 | Cunningham | | H02G 15/103 |
| | | | | 174/73.1 |
| 3,828,114 A * | 8/1974 | Priaroggia | | H02G 15/068 |
| | | | | 174/73.1 |
| 3,992,567 A * | 11/1976 | Malia | | H02G 15/10 |
| | | | | 174/73.1 |
| 4,079,189 A * | 3/1978 | Troccoli | | H02G 15/184 |
| | | | | 174/73.1 |
| 4,194,672 A | 3/1980 | Uto et al. | | |
| 4,487,994 A * | 12/1984 | Bahder | | B29C 61/0616 |
| | | | | 156/49 |
| 4,518,819 A * | 5/1985 | Larsson | | H02G 15/10 |
| | | | | 174/78 |
| 4,551,915 A * | 11/1985 | Larsson | | H02G 15/068 |
| | | | | 174/73.1 |
| 4,631,392 A * | 12/1986 | O'Brien | | H05B 3/56 |
| | | | | 174/102 SC |
| 4,785,139 A * | 11/1988 | Lynch | | G02B 6/4465 |
| | | | | 138/121 |
| 4,822,952 A * | 4/1989 | Katz | | H02G 15/064 |
| | | | | 156/49 |
| 4,833,275 A * | 5/1989 | Fosse | | H02G 15/14 |
| | | | | 174/21 R |
| 4,896,939 A * | 1/1990 | O'Brien | | G02B 6/3816 |
| | | | | 174/11 OR |
| 4,943,685 A * | 7/1990 | Reynaert | | H02G 15/003 |
| | | | | 174/19 |
| 5,234,515 A * | 8/1993 | Sekkelsten | | H01R 4/70 |
| | | | | 156/158 |
| 5,365,020 A * | 11/1994 | Vallauri | | H01R 4/70 |
| | | | | 174/73.1 |
| 5,374,784 A * | 12/1994 | Wentzel | | H02G 15/103 |
| | | | | 156/49 |
| 5,661,842 A * | 8/1997 | Faust | | H01R 4/72 |
| | | | | 385/139 |
| 5,801,332 A * | 9/1998 | Berger | | H02G 15/103 |
| | | | | 174/73.1 |
| 6,025,560 A * | 2/2000 | Buyst | | H02G 15/103 |
| | | | | 174/88 C |
| 2010/0075535 A1* | 3/2010 | Mizutani | | H01R 13/5216 |
| | | | | 439/588 |
| 2011/0188803 A1* | 8/2011 | Kordahi | | G02B 6/28 |
| | | | | 385/24 |
| 2012/0048612 A1* | 3/2012 | Bunyan | | H02G 13/00 |
| | | | | 174/358 |
| 2014/0294490 A1 | 10/2014 | Dechao et al. | | |
| 2018/0006439 A1* | 1/2018 | Meier | | H02G 15/103 |
| 2018/0034254 A1* | 2/2018 | Thomson | | H02G 3/22 |

FOREIGN PATENT DOCUMENTS

| | | | |
|---|---|---|---|
| EP | 2113978 A1 | 11/2009 | |
| FR | 2016907 A1 | 5/1970 | |
| GB | 1020006 A | 2/1966 | |
| JP | S4953291 U | 5/1974 | |
| JP | S561722 A | 1/1981 | |
| JP | S563517 A | 1/1984 | |
| JP | 10285738 A | 10/1998 | |
| JP | 4638749 B2 | 2/2011 | |
| JP | 4795892 B2 | 10/2011 | |
| JP | 2014135789 | 7/2014 | |
| JP | 2014188591 A | 10/2014 | |
| WO | 2011000881 A2 | 1/2011 | |
| WO | WO-2017174127 A1 * | 10/2017 | H02G 15/05 |

OTHER PUBLICATIONS

International Search Report and Written Opinion of the International Searching Authority Application No. PCT/EP2016/060878 Completed: Nov. 21, 2016; dated Nov. 29, 2016 12 pages.
Written Opinion of the International Searching Authority Application No. PCT/EP2016/060878 dated Apr. 3, 2018 7 pages.
Japanese Office Action and Translation Application No. 2018-559926 Completed: Feb. 3, 2020; dated Feb. 12, 2020 4 pages.
Japanese 2nd Office Action with Translation; Application No. 2018-559926; dated Oct. 13, 2020; 12 Pages.
Australian Office Action; Application No. 2016406180; dated Apr. 13, 2021; 3 Pages.

* cited by examiner

JOINT, TERMINATION OR CROSS-CONNECTION ARRANGEMENT FOR A CABLE AND METHOD FOR PROVIDING A JOINT, TERMINATION OR CROSS-CONNECTION ARRANGEMENT

TECHNICAL FIELD

The present disclosure relates to a joint, termination or cross-connection arrangement for a cable, in particular a high voltage cable. The present disclosure further relates to a method of providing a joint, termination or cross-connection arrangement for a cable, in particular a high voltage cable.

BACKGROUND

High voltage electric power cables or power transmission cables are used to transmit electrical power with medium or high voltage. The cables inter alia comprise a conductor, an insulation system that surrounds the conductor and a metallic sheath (for example of lead, copper, aluminium or an alloy of any of these metals) arranged outside of the insulation system. The metallic sheath acts as a diffusion barrier for preventing water from entering into the insulation system. Additional protective layers, usually of polymer based materials, may be arranged outside of the metallic sheath in order to prevent damage thereof.

A long deep-sea high voltage cable comprises a plurality of consecutive cables or cable parts which are joined together. The joining process is performed on a cable ship, or the like, before the cable is laid down in the sea. A protective casing, usually made of stainless steel, is used to protect the joint between two consecutive cables or cable parts. The protective casing is joined to the respective metallic sheath of the two cables to ensure a water tight connection. The protective casing may also serve as a metallic connection between the metallic sheaths of two consecutive cables or cable parts, and provides mechanical stability to the joint. In addition to joining consecutive cables to form a longer cable, the protective casing may also be utilised in case of repairing a high voltage cable.

Wipe soldering with a lead based solder may be used for connecting the metallic sheath of the cable and the stainless steel casing. The lead based solder provides the water tight connection which is essential to avoid damage of the cable joint. In the joining process, a cable part which is stripped down to the bare metallic sheath is inserted into a tubular end portion of the protective casing. Thereafter, wipe soldering is performed around the outer periphery of the end of the protective casing and the adjacent metallic sheath such as to join the protective casing and the metallic sheath around the whole circumference.

There is a strive to avoid lead containing materials for environmental and health purposes within most technical fields and for example the European Union has certain regulations prohibiting use of materials comprising lead, but wipe soldering metal alloys have so far been exempted from such regulations. However, it is expected that with new future regulations, wipe soldering using a lead based solder may be prohibited which means that the cable industry will have to consider alternative connections methods not requiring the use of a lead based solder.

SUMMARY

The object of the present invention is to find an alternative solution for providing a water tight and electrically connecting connection between the metallic sheath of a cable and a protective casing which solution does not rely on the use of materials comprising lead.

The object is achieved by a joint, termination or cross-connection arrangement for a cable and by a method of providing such a joint, termination or cross-connection arrangement, respectively, as defined by the appended independent claims.

The present invention solves the above problem by, instead of soldering the protective casing to the metallic sheath of the cable, providing a water tight connection between the metallic sheath of the first cable and the protective casing by welding. In contrast to the conventional solders used in this technical field, weld filler materials do not rely on the presence of lead for obtaining desired properties during the welding process and of the resulting weld seam. Thereby, the use of a lead based solder is avoided.

A protective casing adapted for protecting a joint, a termination or a cross-connection and a metallic sheath of a cable within the present technical field may often be made of different materials which not necessarily may be easily welded to each other or, if welded to each other, may risk deterioration of the properties thereof if welded to each other. For example, if the different materials are welded directly to each other, the welding process may cause diffusion of elements between the materials which can risk deteriorate the corrosion resistance or the mechanical properties of the metallic sheath of the first cable and/or the protective casing. For said reason, the present invention utilises a transition sleeve which is welded to the metallic sheath in one end and at another location to the protective casing. The transition sleeve enables more alternatives when selecting materials of the constituent parts (including the protective casing and the metallic sheath of the cable), thereby for example avoiding the need for altering the material of the metallic sheath and/or the material of the protective casing to enable welding and a connection having the desired properties in terms of both mechanical and chemical properties.

The joint, termination or cross-connection arrangement for a cable comprises at least a first cable and a protective casing. The first cable comprises a metallic sheath, and a first longitudinal end portion wherein the metallic sheath is exposed. The protective casing is essentially rotational symmetrical around a longitudinal axis and comprises a first tubular end portion coaxial with the longitudinal axis and through which the first longitudinal end portion of the first cable extends. The arrangement further comprises a rotational symmetrical transition sleeve coaxial with the longitudinal axis of the protective casing. The transition sleeve comprises a first longitudinal end surface and a second longitudinal end surface. Each of the longitudinal end surfaces of the transition sleeve may suitably be essentially radially arranged. The transition sleeve is, at the first longitudinal end surface welded to the metallic sheath of the first cable around the whole circumference of the metallic sheath. The transition sleeve is further welded to the first tubular end portion of the protective casing around the whole circumference of the transition sleeve.

Since the transition sleeve is welded both to the metallic sheath of the cable and to the protective casing around the whole circumference of the interface between the transition sleeve and the metallic sheath and the protective casing, respectively, a water tight connection between the metallic sheath and the protective casing is ensured which is essential in order to avoid the risk of water diffusing into the protective casing which in turn could damage the cable and ultimately initiate electrical breakdown of the cable.

Furthermore, as explained above, the transition sleeve enables more alternatives when it comes to selection of materials of the constituent components of the arrangement. For example, by selecting a material of the transition sleeve having good weldability to both the material of the metallic sheath of the first cable and the material of the protective casing, there is no need for changing the material of the metallic sheath and/or the protective casing to enable them to be welded to each other. Alternatively, another construction of the arrangement may be used to enable providing a satisfactory connection between the metallic sheath and the protective casing.

According to one embodiment, the transition sleeve may optionally comprise a first sleeve part extending from the first longitudinal end surface to the second longitudinal end surface of the transition sleeve, and a radially opposing second sleeve part extending from the first longitudinal end surface to the second longitudinal end surface of the transition sleeve. This may for example facilitate assembly of the transition sleeve and the metallic sheath and/or tubular end portion of the protective casing. The transition sleeve may naturally comprise more than two sleeve parts, each extending from the first longitudinal end surface to the second longitudinal end surface of the transition sleeve for the same purpose as disclosed above. Furthermore, the sleeve parts, irrespectively of the number of sleeve parts, are suitably welded to each other such as to jointly define the rotational symmetrical sleeve.

The transition sleeve may comprise a first rotational symmetrical section having a first inner diameter and a second rotational symmetrical section having a second inner diameter, the second inner diameter being greater than the first inner diameter, the second rotational symmetrical section of the transition sleeve comprising the second longitudinal end surface of the transition sleeve. In such a case, the transition sleeve may be arranged such that the second rotational symmetrical section thereof is at least partly provided radially outside of the first tubular end portion of the protective casing. This enables welding of the transition sleeve to an outer circumferential surface of the first tubular end portion of the protective casing, while at the same time enabling welding of the first longitudinal end surface of the transition sleeve directly to the metallic sheath of the cable.

In case the transition sleeve comprises a first and a second rotational symmetrical section as disclosed above, the first tubular end portion of the protective casing may suitably comprise a buffer coating, preferably of nickel or a nickel based alloy, forming an outermost circumferential surface of at least a part of the first tubular portion. The second longitudinal end surface of the transition sleeve is welded to said buffer coating. The purpose of the buffer coating may for example be to minimise diffusion of elements between the protective casing and the transition sleeve during the welding process in case the protective casing and the transition sleeve are made of different materials and such diffusion may deteriorate the mechanical or chemical properties of the protective casing and/or the transition sleeve. Alternatively, or in addition, the purpose of the buffer coating may be to enable welding in case the materials of the transition sleeve and the protective casing, respectively, are not materials which may be easily welded to each other.

The transition sleeve may suitably be made of the same material as the metallic sheath of the first cable. Thereby, a good weldability to the metallic sheath is ensured.

According to an alternative embodiment, the transition sleeve is arranged such that it is partly interposed between an inner surface of the first tubular end portion of the protective casing and the metallic sheath of the first cable, and such that it extends longitudinally outside of the protective casing. Thereby, the transition sleeve may also serve the purpose of providing a good fit between the inner surface and the first tubular end portion and the metallic sheath of the first cable while at the same time having the first longitudinal end surface of the transition sleeve exposed outside of the protective casing to enable welding thereof to the metallic sheath and having a surface to which the first tubular end portion of the protective casing can be welded to the transition sleeve.

The transition sleeve may suitably be made of nickel or a nickel based alloy. Nickel or nickel based alloys generally has good weldability to most other metallic materials used within the technical field and thus enables good weldability to both the metallic sheath and the protective casing.

The metallic sheath of the first cable may be a corrugated metallic sheath comprising peaks and valleys, the peaks having a greater outer diameter than the valleys, and the first longitudinal end surface of the transition sleeve may be welded to the metallic sheath of the first cable around the whole circumference of the metallic sheath at a peak of the corrugated metallic sheath. The purpose of a corrugated metallic sheath may be to provide good mechanical stability to the cable. Furthermore, by welding the transition sleeve to a peak of the corrugated metallic sheath, the risk of damaging any part of the cable arranged radially inside of the metallic sheath during the welding process can be minimised.

In the case of a the metallic sheath of the first cable being a corrugated metallic sheath, at least a longitudinal part of a circumferential inner surface of the transition sleeve may have a corrugated form conforming to the outer surface of the corrugated metallic sheath of the first cable. This has the advantage of ensuring a correct position of the transition sleeve along the longitudinal extension of the first cable and/or providing a good fit between the metallic sheath of the first cable and the inner surface of the tubular end portion of the protective casing.

The present disclosure also relates to a method of providing a joint, termination or cross-connection arrangement for a cable, the arrangement comprising at least a first cable and a protective casing. The first cable comprises a metallic sheath and a first longitudinal end portion wherein the metallic sheath is exposed. The protective casing is essentially rotational symmetrical around a longitudinal axis and comprises a first tubular end portion coaxial with the longitudinal axis. The method comprises a step of:

a) introducing the first longitudinal end portion of the first cable into the first tubular end portion of the protective casing such that the first longitudinal end portion of the first cable extends through the first tubular end portion of the protective casing.

The method further comprises the steps of:

b) arranging a rotational symmetrical transition sleeve comprising a first longitudinal end surface and a second longitudinal end surface on the metallic sheath of the first cable such that when the first longitudinal end portion of the first cable extends through the first tubular end portion of the protective casing the transition sleeve is coaxial with the longitudinal axis of the protective casing, the first longitudinal end surface is longitudinally distanced from the first tubular end portion, and the second longitudinal end surface is arranged radially inwards or radially outwards of the first tubular end portion, c) welding the transition sleeve, at the first longitudinal end surface thereof, to the metallic sheath of the first cable around the whole circumference of the metallic sheath, and d) either before or after step (c), welding the transition sleeve to the first tubular end portion of the protective casing around the whole circumference of the transition sleeve, wherein any one of steps (b) to (d) may be performed either before or after step (a), but at least one of step (c) and (d) is performed after both step (a) and step (b).

Step (b) above may comprise providing a plurality of sleeve parts, assembling the sleeve parts so that the sleeve parts jointly define the rotational symmetrical transition sleeve and each sleeve part extends from the first longitudinal end surface to the second longitudinal end surface of the transition sleeve. The sleeve parts may preferably be welded to each other. Use of a plurality of sleeve parts to form a transition sleeve may facilitate assembly of the joint, termination or cross-connection arrangement and facilitate a good fit between the consecutive components of the arrangement.

According to one embodiment, the transition sleeve comprises a first rotational symmetrical section having a first inner diameter and a second rotational symmetrical section having a second inner diameter greater than the first inner diameter, the second rotational symmetrical section of the transition sleeve comprising the second longitudinal end surface of the transition sleeve, and the transition sleeve is arranged on the metallic sleeve of the first cable such that, when the first longitudinal end portion of the first cable extends through the first tubular end portion of the protective casing, the second rotational symmetrical section of the transition sleeve is at least partly provided radially outside of the first tubular end portion of the protective casing such that the second longitudinal end surface of the transition sleeve is arranged radially outside of the first tubular end portion of the protective casing. This provides for the possibility of welding the second longitudinal end surface of the transition sleeve to an outer circumferential surface of the first tubular end portion of the protective casing and may facilitate assembly of the arrangement.

The first tubular end portion of the protective casing may comprise a buffer coating of a material with good weldability, preferably nickel or a nickel based alloy, forming the outermost circumferential surface of at least a part of the first tubular end portion, and the welding of the transition sleeve to the first tubular end portion of the protective casing comprises welding the second end surface of the transition sleeve to said buffer coating. The presence of such a buffer coating may for example be to minimise diffusion of elements between the protective casing and the transition sleeve during the welding process in case the protective casing and the transition sleeve are made of different materials and such diffusion may deteriorate the mechanical or chemical properties of the protective casing and/or the transition sleeve. Alternatively, or in addition, the purpose of the buffer coating may be to enable welding in case the materials of the transition sleeve and the protective casing, respectively, are not materials which may be easily welded to each other.

The transition sleeve may optionally be made of the same material as the metallic sheath of the first cable. Thereby, a good weldability to the metallic sheath is ensured.

According to another embodiment, step (b) comprises arranging the transition sleeve such that, when the first longitudinal end portion of the first cable extends through the first tubular end portion of the protective casing, the transition sleeve is partly interposed between an inner surface of the first tubular end portion of the protective casing and the metallic sheath of the first cable and the second longitudinal end surface of the transition sleeve is arranged radially inside of the first tubular end portion of the protective casing. Thereby, the transition sleeve may also serve the purpose of providing a good fit between the inner surface of first tubular end portion and the metallic sheath of the first cable while at the same time having the first longitudinal end surface of the transition sleeve exposed outside of the protective casing to enable welding thereof to the metallic sheath and having a surface to which the first tubular end portion of the protective casing can be welded to the transition sleeve.

The transition sleeve may suitably be made of nickel or a nickel based alloy. Nickel or nickel based alloys generally have good weldability to materials used within the present technical field and are therefore suitable for use in the transition sleeve to ensure that it may be easily welded to both the metallic sheath of the first cable as well as to the first tubular end portion of the protective casing.

The metallic sheath of the first cable may optionally be a corrugated metallic sheath comprising alternative peaks and valleys, the peaks having a greater outer diameter than the valleys. If so, the welding of the first longitudinal end surface of the transition sleeve to the metallic sheath may optionally be performed such that a resulting weld seam is located at a peak of the corrugated metallic sheath of the first cable around the whole circumference of the metallic sheath of the first cable. By welding the transition sleeve to a peak of the corrugated metallic sheath, the risk of damaging any part of the cable arranged radially inside of the metallic sheath during the welding process can be minimised.

DETAILED DESCRIPTION

The invention will be described in more detail below with reference to the accompanying drawings. The invention however is not limited to the embodiments shown and discussed, but may be varied within the scope of the appended claims. Moreover, the drawings shall not be considered drawn to scale as some features may be exaggerated in order to more clearly illustrate the features of the protective casing or details thereof.

In the present disclosure, the terms "outer" and "inner", respectively, shall be considered to refer to a location in a radial direction unless explicitly disclosed otherwise.

Furthermore, in the present disclosure, the term "metallic" shall be considered to mean made of a metal or a metal alloy.

Moreover, in the present disclosure, the expression "around the whole circumference of" shall be considered to mean as extending circumferentially from one point to the same one point of the feature to which it refers. However, said expression does not imply any axial/longitudinal extension in itself. For example, "around the whole circumference of the metallic sheath" shall be considered to mean extending from one point of the metallic sheath circumferentially to the same one point, but does not in itself imply any limitation as to where said point is longitudinally on said metallic sheath or any limitation as to the longitudinal extension of the feature to which it refers.

Figure 1:
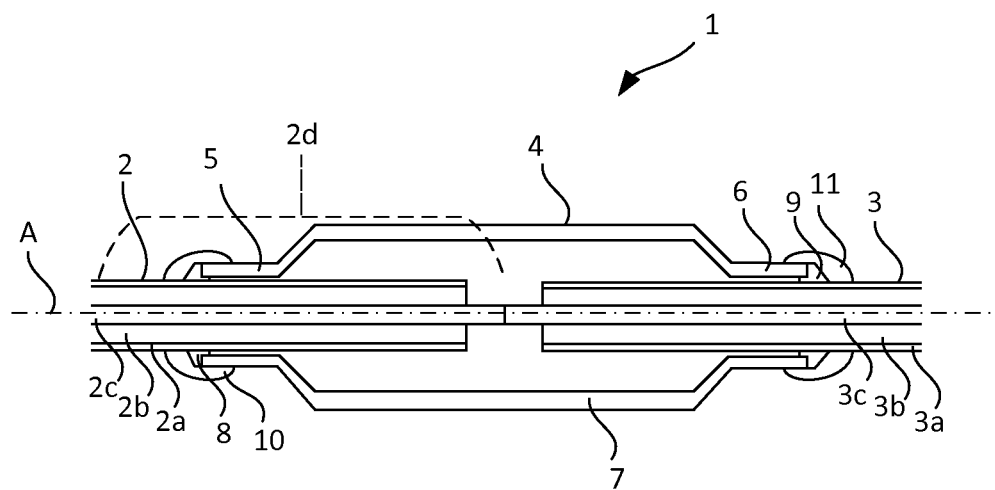
FIG. 1 illustrates a cross sectional view of a joint arrangement for joining two cables in accordance with prior art.

FIG. 1 illustrates a cross sectional view of a joint arrangement 1 comprising a first cable 2 and a second cable 3, in accordance with prior art. The joint arrangement may for example be used for joining the first and second cables so as to form for example a long deep-sea high voltage cable. The first and second cables each comprise a respective metallic sheath 2a, 3a, a respective insulation system 2b, 3b inside the metallic sheath, as well as one or more conductors 2c, 3c inside of the respective insulation system. The conductors 2c, 3c of the consecutive cables 2, 3 are connected inside a protective casing 4 enclosing the connection.

The protective casing 4 is essentially rotational symmetrical around a central axis A. The protective casing comprises a first tubular end portion 5 at a first longitudinal end of the protective casing, and a second tubular end portion 6 at the opposing second longitudinal end of the protective casing. The tubular end portions each comprise a respective opening adapted to receive an end portion 2d (in the figure only marked for the first cable 2) of a respective cable when inserted therein. The protective casing further comprises a tubular central portion 7 arranged between the first and second tubular end portions 5, 6. The tubular central portion generally has a greater inner diameter than the respective inner diameters of the first and second tubular end portions. The tubular central portion generally also has a greater outer diameter than the outer diameters of the first and second tubular end portions. While not illustrated in FIG. 1, the protective casing 4 need not necessarily be constructed of a single casing body but may alternatively be constructed of a first longitudinal casing half and a second longitudinal casing half mounted and joined together so as to together forming the protective casing 4.

In the process of joining the cables, an end portion of a cable with the metallic sheath exposed is inserted into the protective casing through the first tubular end portion. Thereafter, the conductor 2c of the first cable 2 is connected to the connector 3c of the second cable 3. In the case of the protective casing consisting of a single casing body, the position of the protective casing is adjusted so as to enclose the connection between the connector and such that the respective tubular end portions are arranged radially outside of the respective metallic sheaths of the cables 2, 3. In the case of the protective casing comprising two casing halves, the end portions of the cables 2, 3 are introduced into the tubular end portion of the respective casing half, the conductors 2c, 3c of the cables connected, and thereafter the casing halves are moved towards each other and joined such as to jointly define the tubular central portion 7. Irrespective of a single casing body or two casing halves, a respective soldering cone 8, 9 may be used to provide a good fit between the metallic sheath and the inner surface of the respective tubular end portion 5, 6.

The protective casing 4 is at each longitudinal end thereof soldered to the respective metallic sheaths of the first and second cables 2, 3 by means of wipe soldering. Thereby, a solder 10, 11 is arranged such as to extend from a tubular end portion 5, 6 of the protective casing 4 to the metallic sheath 2a, 3a of a cable around the whole circumference of the metallic sheath and tubular end portion. In case of the presence of a soldering cone 8, 9, the solder 10, 11 extends over the solder cone. The solder 10, 11 forms a water tight connection between the metallic sheath of a cable and the protective casing.

Even though the prior art disclosed above with reference to FIG. 1 provides an excellent joint in terms of mechanical stability and protection of the connection between the conductors of the cables, it is based on the usage of a solder 10, 11 comprising a significant amount of lead. In the future, lead based solders may likely be prohibited and a new solution for joining cables, such as high voltage cables to form a long deep sea high voltage cable, is likely to become necessary.

In contrast to the above described method and joint construction, the present invention is based on the use of welding for obtaining the water tight connection between the metallic sheath of a cable and the protective casing.

Figure 2:
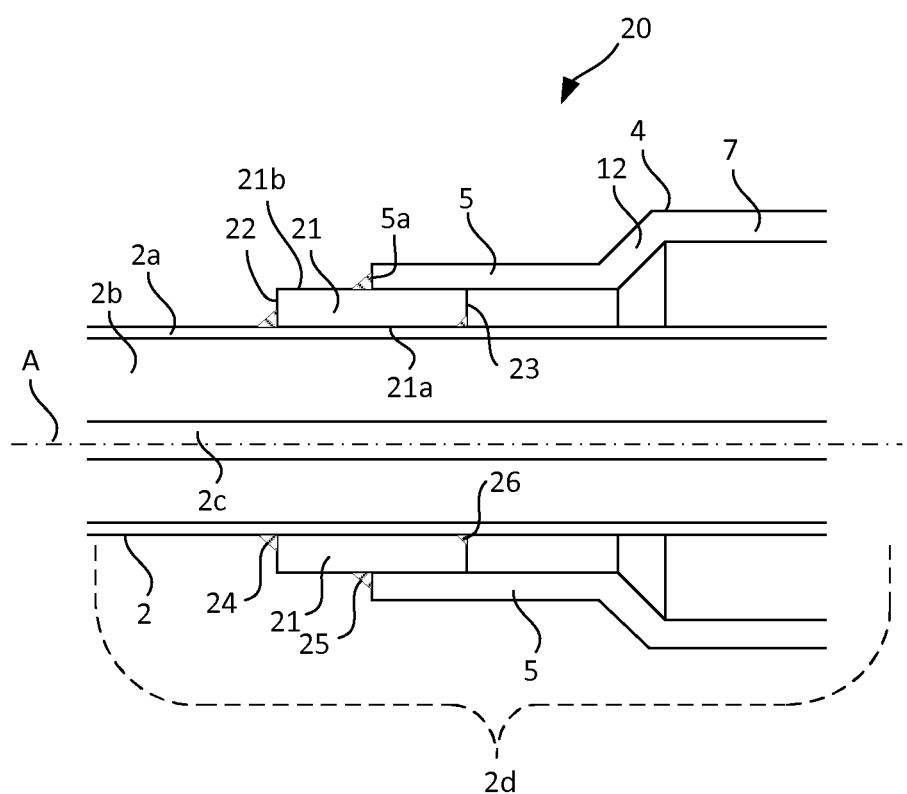
FIG. 2 illustrates a cross sectional view of a joint arrangement according to a first exemplifying embodiment.
Figure 4:
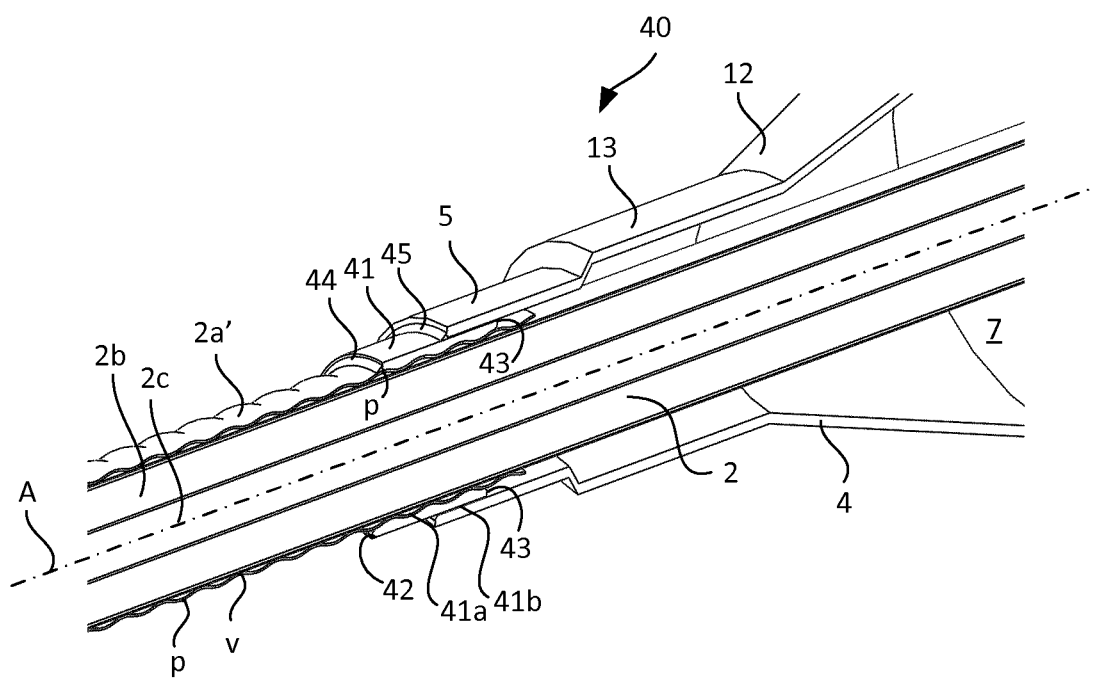
FIG. 4 illustrates a perspective view in cross section of a joint arrangement according to a third exemplifying embodiment.
Figure 5:
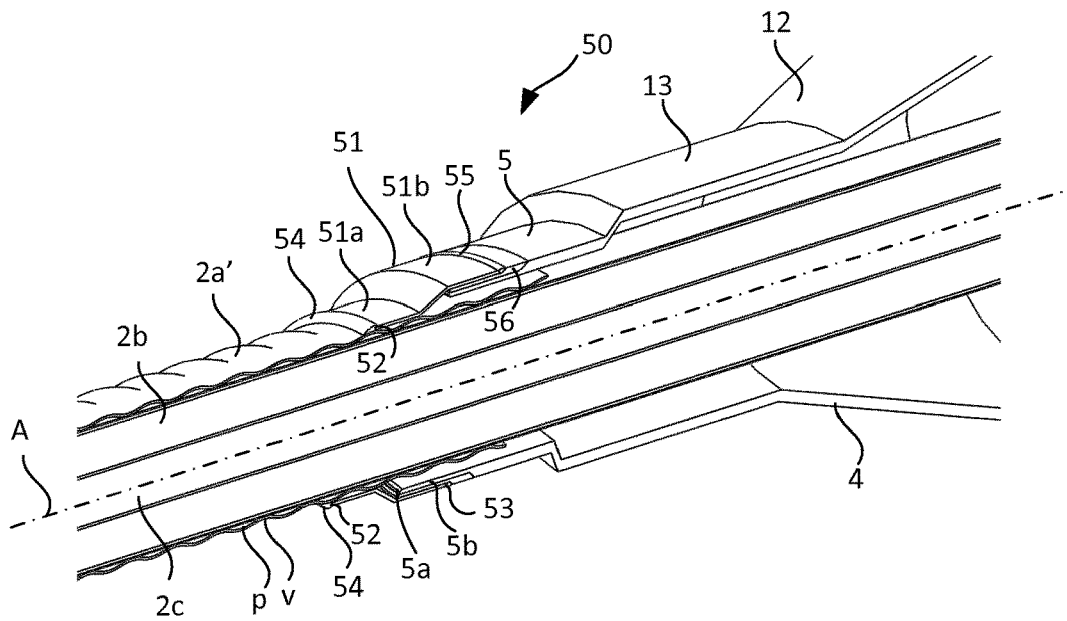
FIG. 5 illustrates a perspective view in cross section of a joint arrangement according to a fourth exemplifying embodiment.

FIG. 2 illustrates a cross sectional view of a joint arrangement 20 according to one exemplifying embodiment of the present invention. The joint arrangement 20 comprises a first cable 2 comprising a conductor 2c, an insulation system 2b arranged radially outside of the conductor, and a metallic sheath 2a arranged radially outside of the insulation system. It should be noted that the first cable 2 may suitably comprise additional protective layers arranged radially outside of the metallic sheath 2a along the longitudinal extension of the cable. However, at the first longitudinal end portion 2d of the first cable 2, such additional protective layers are removed such that the metallic sheath 2a is exposed. The joint arrangement further comprises a protective casing 4 comprising a first tubular end portion 5 arranged at a first longitudinal end of the protective casing as well as a tubular central portion 7. The protective casing may optionally comprise additional intermediate portions, such as a transition portion 12 connecting the first tubular end portion 5 to the tubular central portion 7 and/or additional intermediate tubular portion(s) (for example as shown in FIGS. 4 and 5). The first longitudinal end portion 2d of the first cable 2 is arranged such as to extend through the first tubular end portion 5 and further into a tubular central portion 7 of the protective casing 4. Thereby, the conductor 2c of the first cable 2 can be connected to a conductor of a consecutive second cable inside the tubular central portion 7 of the protective casing 4.

The joint arrangement further comprises a rotational symmetrical transition sleeve 21 coaxial with the longitudinal axis A of the protective casing 4. The transition sleeve comprises a first, preferably essentially radially arranged, longitudinal end surface 22 and a second, preferably essentially radially arranged, longitudinal end surface 23. The transition sleeve 21 further comprises an inner circumferential surface 21a and an outer circumferential surface 21b.

The transition sleeve is arranged such that it is partly interposed between the metallic sheath 2a of the first cable 2 and the inner surface of the first tubular end portion 5 of the protective casing 4. Thereby, the transition sleeve fills the radial space between the metallic sleeve of the first cable and the inner surface of the first tubular end portion of the protective casing at least in the vicinity of the open end of the tubular end portion. This ensures a good fit between the metallic sheath 2a and the first tubular end portion 5. The transition sleeve 21 is also arranged such as to extend outside of the first tubular end portion 5 such that the first longitudinal end surface 22 is distanced from the first tubular end portion 5, more particularly an end surface 5a of the first tubular end portion at the open end thereof, in the longitudinal direction along the central axis A. In other words, the transition sleeve 21 has a longitudinal extension outside of the protective casing 4.

The transition sleeve 21 is welded to the metallic sleeve of the first cable 2 at the first longitudinal end surface 22 of the transition sleeve. Thereby, a first weld seam 24 extends around the whole circumference of the metallic sheath 2a of the first cable 2. The first weld seam 24 provides a water tight connection between the metallic sheath 2a of the first cable 2 and the transition sleeve 21.

The transition sleeve 21 is further welded to the first tubular end portion 5 of the protective casing 4 around the whole outer circumference of the transition sleeve. As shown in FIG. 2, this may suitably be achieved by means of a second weld seam 25 arranged between the outer circumferential surface 21b of the transition sleeve and the end surface 5a of the tubular end portion at the open end thereof.

The transition sleeve 21 may optionally also be welded to the metallic sheath of the first cable at the second longitudinal end surface of the transition sleeve as illustrated by a third weld seam 26 in FIG. 2. The purpose of such an optional third weld seam 26 may for example be to secure the transition sleeve in place in the metallic sheath before it is inserted into the first tubular end portion of the protective casing.

Figure 3:
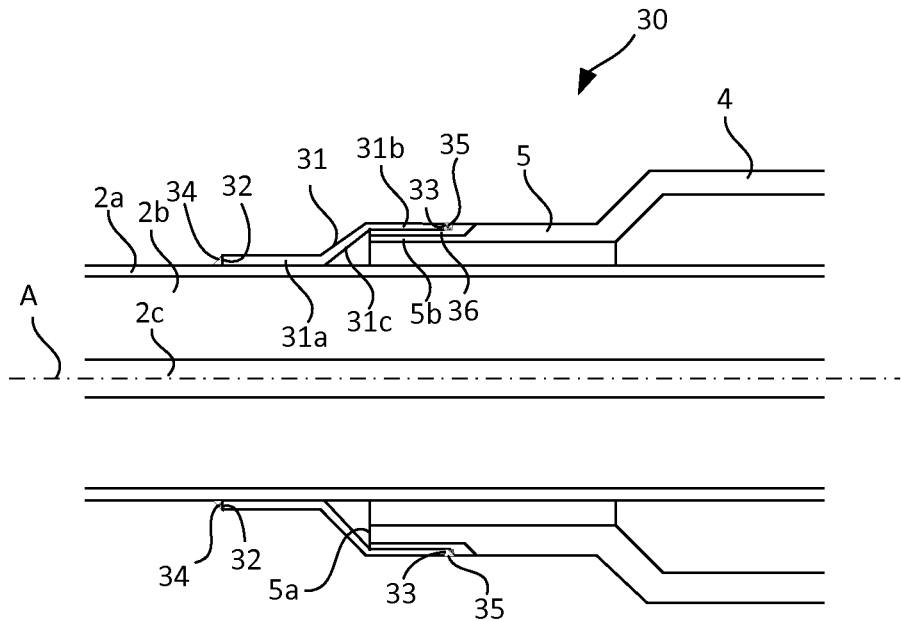
FIG. 3 illustrates a cross sectional view of a joint arrangement according to a second exemplifying embodiment.

FIG. 3 illustrates a cross sectional view of a joint arrangement 30 according to a second exemplifying embodiment. In the same manner as disclosed above with reference to the exemplifying embodiment illustrated in FIG. 2, the joint arrangement 30 illustrated in FIG. 3 comprises a first cable 2 comprising a conductor 2c, an insulation system 2b arranged radially outside of the conductor, and a metallic sheath 2a arranged radially outside of the insulation system. At the first longitudinal end portion 2d of the first cable 2, possible additional protective layers (not shown) arranged radially outside of the metallic sheath along the longitudinal extension of the cable are removed such that the metallic sheath 2a is exposed at the first longitudinal end portion. The joint arrangement 30 further comprises a protective casing 4 comprising a first tubular end portion 5 arranged at a first longitudinal end of the protective casing. The first longitudinal end portion 2d of the first cable 2 is arranged such as to extend through the first tubular end portion 5 and further into a tubular central portion 7 of the protective casing 4. Thereby, the conductor 2c of the first cable 2 can be connected to a conductor of a consecutive second cable inside the tubular central portion 7 of the protective casing 4 in essentially the same manner as disclosed above with reference to prior art illustrated in FIG. 1.

The joint arrangement 30 according to the second exemplifying embodiment further comprises a rotational symmetrical transition sleeve 31 coaxial with the longitudinal axis A of the protective casing 4. The transition sleeve 31 comprises a first, preferably essentially radially arranged, longitudinal end surface 32 and a second, preferably essentially radially arranged, longitudinal end surface 33. The transition sleeve 31 further comprises a first rotational symmetrical section 31a having a first inner diameter, and a second rotational symmetrical section 31b having a second inner diameter. The second inner diameter of the second section 31b is greater than the first inner diameter of the first section 31a. The purpose of the first rotational symmetrical section 31a and second rotational symmetrical section 31b of the transition sleeve 31 is to enable the transition sleeve to be partly arranged radially outside of the first tubular end portion 5 of the protective casing 4 while at the same time being in contact with the metallic sheath 2a of the first cable 2. The first and second rotational symmetrical sections 31a, 31b may for example be connected to each other by a connecting section 31c having a varying inner diameter along the longitudinal extension of the connecting section 31c. Such a connecting section 31c, where present, also constitutes a part of the transition sleeve 31.

As shown in FIG. 3, the transition sleeve 31 is arranged such that the second rotational symmetrical section 31b of the transition sleeve is at least partly provided radially outside of the first tubular end portion of the protective casing 4. The first rotational symmetrical section 31a is however distanced in the longitudinal direction along the central axis A from the first tubular end portion 5 and fitted to the metallic sheath 2a of the first cable 2.

The transition sleeve 31 is welded to the metallic sheath 2a of the first cable 2 at the first longitudinal end surface 32 of the transition sleeve. Thereby, a first weld seam 34 extends around the whole circumference of the metallic sheath 2a of the first cable 2. The first weld seam 34 provides a water tight connection between the metallic sheath 2a of the first cable 2 and the transition sleeve 31.

The transition sleeve 31 is furthermore welded to the first tubular end portion 5 of the protective casing 4 around the whole circumference of the transition sleeve 31 such as to provide a water tight connection between the transition sleeve and the first tubular end portion. Thereby, a second weld seam 35 extends around the whole circumference of the transition sleeve at the second longitudinal end surface 33 of the transition sleeve, and thus also around the whole circumference of the first tubular end portion of the protective casing.

As seen in FIG. 3, the first tubular end portion 5 may comprise a buffer coating 36 forming the outermost circumferential surface of at least a part 5b of the first tubular end portion. The purpose of such a buffer coating may be facilitate welding between the material of the transition sleeve and the bulk material of the protective casing in case of the materials of the transition sleeve and the protective casing, respectively, being of the kind that may be difficult to weld directly to each other. The buffer coating may also serve the purpose of minimising the risk for diffusion or migration of elements between the material of the transition sleeve and the bulk material of the protective casing (more particularly the first tubular end portion of the protective casing) where such a diffusion or migration may risk deteriorating the properties of the materials of one or both of the transition sleeve and the protective casing. Thus, in the case of a presence of such a buffer coating 36, the transition sleeve 31 is welded to the buffer coating 36 of the first tubular end portion 4.

By way of example only, considering a situation where the metallic sheath 2a of the first cable 2 is copper or a copper based alloy and the bulk material of the protective casing is stainless steel. The transition sleeve 31 may suitably be made of copper or a copper based alloy, preferably with essentially the same chemical composition as the metallic sheath 2a, in order to ensure good weldability to the metallic sheath. However, copper or copper based alloys may not be suitable for welding directly to stainless steel since copper may diffuse or migrate into the stainless steel during the welding process which in turn may lead to deteriorated corrosion resistance of the stainless steel. Therefore, a buffer coating 36 of nickel or a nickel based alloy may be interposed between the stainless steel of the first tubular end portion 5 of the protective casing 4 and the transition sleeve 31, the buffer coating constituting the outermost circumferential surface of the first tubular portion of the protective casing at the part thereof where it is welded to the transition sleeve 31.

In the first and second exemplifying embodiments shown in FIG. 2 and FIG. 3, respectively, the metallic sheath 2a of the first cable 2 is a metallic sheath which has an essentially constant outer diameter along the longitudinal extension of the cable 2. However, in certain cases, the metallic sheath may be a corrugated sheath. The purpose of such a corrugated sheath is generally to increase the mechanical stability of the cable. A corrugated sheath comprises alternating peaks and valleys along the longitudinal extension of the cable. The peaks and valleys may also be formed in a helical configuration along the longitudinal extension of the cable.

FIG. 4 illustrates a perspective view, cut to show a cross section, of a joint arrangement 40 for a cable according to a third exemplifying embodiment. The joint arrangement 40 comprises a first cable 2 comprising a conductor 2c, an insulation system 2b arranged radially outside of the conductor 2c, and a metallic sheath 2a' arranged radially outside of the insulation system 2b. In contrast to the exemplifying embodiment illustrated in FIG. 2, the metallic sheath 2a' according to this third exemplifying embodiment is a corrugated metallic sheath, and thus comprises a plurality alternating peaks p and valleys v together rendering the metallic sheath 2a' an undulating shape along the longitudinal extension of the cable 2. The peaks p have a greater outer diameter than the outer diameter of the valleys v. The joint arrangement 40 further comprises a protective casing 4 comprising a first tubular end portion 5 at a first longitudinal end thereof. The protective casing may optionally further comprise one or more intermediate tubular portions 13 and/or one or more transition portions 12 arranged between and connecting the first tubular end portion 5 and the tubular central portion 7. Moreover, the joint arrangement 40 also comprises a transition sleeve 41 having a first, preferably essentially radially arranged, longitudinal end surface 42 and a second, preferably essentially radially arranged, longitudinal end surface 43 opposite the first longitudinal end surface 42.

As illustrated in FIG. 4, the transition sleeve 41 may comprise an inner surface 41a having a corrugated form so as to conform to the corrugated form of the metallic sheath 2a'. The purpose of such a corrugated inner surface 41a may for example to facilitate ensuring that the transition sleeve 41 is kept in place during introduction of the cable into the first tubular end portion 5 of the protective casing 4 during assembly. A corrugated inner surface of the transition sleeve 41 is however not a necessary feature. For example, in case there is a desire to be able to longitudinally move the transition sleeve 41 along the metallic sheath 2a' during assembly of the joint arrangement, the inner surface may suitably be without corrugations (such as shown for example in FIG. 2). The circumferential outer surface 41b of the transition sleeve 41 is suitably essentially flat, i.e. without any peaks and valleys or the like, in order to provide a good fit to the inner circumferential surface of the first tubular end portion 5 of the protective casing 4.

The transition sleeve 41 is arranged such that it is partly interposed between the metallic sheath 2a' and first tubular end portion 5 of the protective casing 4, but has a longitudinal extension outside of the first tubular end portion 5 such that it extends longitudinally outside of the protective casing 4 as such. The transition sleeve 41 is thereby arranged in the radial space between the metallic sleeve 2a' of the first cable 2 and the inner surface of the first tubular end portion 5 of the protective casing 4 at least in the vicinity of the open end of the tubular end portion 5.

The transition sleeve 41 is welded to the metallic sheath 2a' of the first cable 2 at the first longitudinal end surface 42 of the transition sleeve. Thereby, a first weld seam 44 extends around the whole circumference of the metallic sheath 2a' of the first cable 2. The first weld seam 44 provides a water tight connection between the metallic sheath 2a' of the first cable 2 and the transition sleeve 41. The weld seam 44 may optionally be arranged at a peak p of the metallic sheath 2a' as shown in FIG. 4, but may also be arranged at a valley v or even covering both a peak p and a valley v if desired. One advantage of arranging the weld seam 44 only at a peak is that it may reduce the risk of the welding process causing damages to the insulation system 2b of the first cable 2 in case such a risk exists.

In the same manner as disclosed with reference to the exemplifying embodiments as illustrated in FIG. 2, the transition sleeve 41 is further welded to the first tubular end portion 5 of the protective casing 4 around the whole outer circumference of the transition sleeve 41. As shown in FIG. 4, this may suitably be achieved by means of a second weld seam 45 arranged between the outer circumferential surface 41b of the transition sleeve and the end surface 5a of the tubular end portion at the open end thereof.

While not illustrated in FIG. 4, the transition sleeve may optionally also be welded at the second longitudinal end surface 43 to the metallic sheath 2a' in the same way as shown in FIG. 2 (compare weld seam 26). However, this is generally not necessary.

FIG. 5 illustrates a perspective view, cut to show a cross section, of a joint arrangement 50 according to a fourth exemplifying embodiment. The fourth exemplifying embodiment is similar to the second exemplifying embodiment as shown in FIG. 3, but differs from the second exemplifying embodiment in that the first cable 2 comprises a corrugated metallic sheath 2a' (as also shown in FIG. 4).

The joint arrangement 50 comprises a rotational symmetrical transition sleeve 51 coaxial with the longitudinal axis A of the protective casing 4. The transition sleeve 51 comprises a first, preferably essentially radially arranged, longitudinal end surface 52 and a second, preferably essentially radially arranged, longitudinal end surface 53. The transition sleeve 51 further comprises a first rotational symmetrical section 51a having a first inner diameter, and a second rotational symmetrical section 51b having a second inner diameter. The second inner diameter of the second section 51b is greater than the first inner diameter of the first section 51a. The purpose of the first rotational symmetrical section 51a and second rotational symmetrical section 51b of the transition sleeve 31 is to enable the transition sleeve to be partly arranged radially outside of the first tubular end portion 5 of the protective casing 4 while at the same time being in contact with the metallic sheath 2a' of the first cable 2.

As shown in FIG. 5, the transition sleeve 51 is arranged such that the second rotational symmetrical section 51b of the transition sleeve is at least partly provided radially outside of the first tubular end portion 5 of the protective casing 4. The first rotational symmetrical section 51a is however distanced in the longitudinal direction along the central axis A from the first tubular end portion 5 and fitted to the metallic sheath 2a' of the first cable 2.

The transition sleeve 51 is welded to the metallic sheath 2a' of the first cable 2 at the first longitudinal end surface 52 of the transition sleeve. Thereby, a first weld seam 54 extends around the whole circumference of the metallic sheath 2a' of the first cable 2. The first weld seam may suitably be arranged at a peak p of the corrugated metallic sheath 2a', for the reasons as disclosed with regard to the exemplifying embodiment shown in FIG. 4, but may also be arranged in a valley or covering both a peak and a valley of the corrugated metallic sheath if desired. The first weld seam 54 provides a water tight connection between the metallic sheath 2a' of the first cable 2 and the transition sleeve 51.

The transition sleeve 51 is furthermore welded to the first tubular end portion 5 of the protective casing 4 around the whole circumference of the transition sleeve 51 such as to provide a water tight connection between the transition sleeve and the first tubular end portion. Thereby, a second weld seam 55 extends around the whole circumference of the transition sleeve at the second longitudinal end surface 53 of the transition sleeve, and thus also around the whole circumference of the first tubular end portion 5 of the protective casing 4.

As seen in FIG. 5, the first tubular end portion 5 may comprise a buffer coating 56 forming the outermost circumferential surface of at least a part 5b of the first tubular end portion. The purpose of such a buffer coating may be to facilitate welding between the material of the transition sleeve and the bulk material of the protective casing in case of the materials of the transition sleeve and the protective casing, respectively, being of the kind that may be difficult to weld directly to each other. The buffer coating 56 may also serve the purpose of minimising the risk for diffusion or migration of elements between the material of the transition sleeve and the bulk material of the protective casing (more particularly the first tubular end portion of the protective casing) where such a diffusion or migration may risk deteriorating the properties of the materials of one or both of the transition sleeve and the protective casing. Thus, in the case of a presence of such a buffer coating 56, the transition sleeve 51 is welded to the buffer coating 56 of the first tubular end portion 5 of the protective casing 4.

If desired, and while not shown in FIG. 5, it is naturally also plausible that the first section comprises an inner circumferential surface having a geometrical form conforming the corrugated form of the metallic sheath 2a' for the same reasons as described above with reference to the exemplifying embodiment illustrated in FIG. 4. The second section 51b should however preferably have a smooth inner circumferential surface which conforms to the outer circumferential surface of the first tubular end portion 5 to thereby ensure a good fit thereto.

Figure 6A:
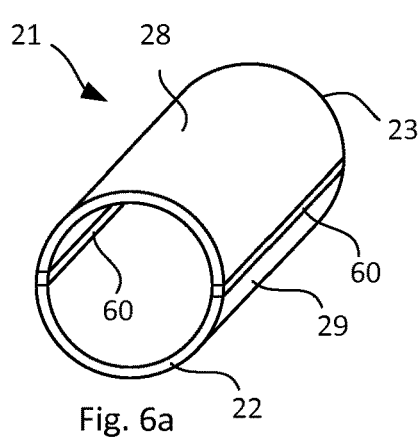
FIG. 6a illustrates a perspective view of a transition sleeve comprising a plurality of sleeve parts according to one exemplifying embodiment.
Figure 6C:
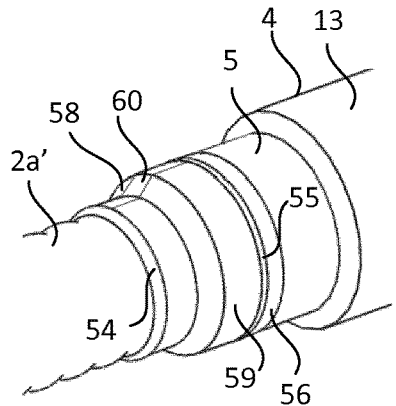
FIG. 6c illustrates a perspective view of a joint arrangement according to another exemplifying embodiment comprising a transition sleeve comprising a plurality of sleeve parts.
Figure 6B:
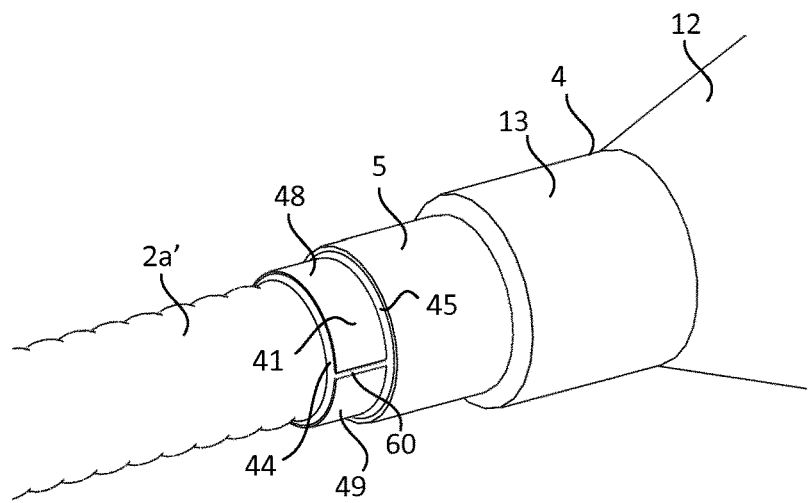
FIG. 6b illustrates a perspective view of a joint arrangement according to an exemplifying embodiment comprising a transition sleeve comprising a plurality of sleeve parts.

Irrespective of whether the transition sleeve of the arrangement according to the present invention has a substantially constant outer diameter or comprises rotational symmetrical sections having different inner diameters, the transition sleeve may be in the form of a monolithic sleeve or comprising a plurality of sleeve parts each extending between the first and second longitudinal end surfaces of the transition sleeve and together defining the rotational symmetrical transition sleeve. A transition sleeve comprising a plurality of sleeve parts each extending between the first and second longitudinal end surfaces of the transition sleeve inter alia has the advantage of facilitating assembly of the arrangement. FIGS. 6a-6c illustrates different exemplifying embodiments wherein the transitional sleeve of the joint arrangement comprises such sleeve parts.

FIG. 6a illustrates a perspective view of a transition sleeve 21 of the exemplifying embodiment shown in FIG. 2, but in the case of not being a monolithic transition sleeve. The transition sleeve 21 comprises a first sleeve part 28 extending between the first longitudinal end surface 22 and the second longitudinal end surface 23 of the transition sleeve 21, as well as a second sleeve part 29 extending between the first longitudinal end surface 22 and the second longitudinal end surface 23 of the transition sleeve 21. The first sleeve part 28 and the second sleeve part 29 are arranged to be radially opposing each other and together define the rotational symmetrical shape of the transition sleeve 21. The first sleeve part 28 and the second sleeve part 29 may be joined to each other by means of weld seams 60.

FIG. 6b illustrates a perspective view of a joint arrangement corresponding to the joint arrangement according to the exemplifying embodiment as shown in FIG. 4 in the case of the transition sleeve 41 comprising a first sleeve part 48 extending between the first longitudinal end surface 42 and the second longitudinal end surface 43 of the transition sleeve 41, as well as a second sleeve part 49 extending between the first longitudinal end surface 42 and the second longitudinal end surface 43 of the transition sleeve 41. The first and second sleeve parts 48, 49 are joined by means of weld seams 60 (only one visible in the figure).

FIG. 6c illustrates a perspective view of a joint arrangement corresponding to the joint arrangement according to the exemplifying embodiment as shown in FIG. 4 in the case of the transition sleeve 51 comprising a first sleeve part 58 extending between the first longitudinal end surface 52 and the second longitudinal end surface 53 of the transition sleeve 51, as well as a second sleeve part 59 extending between the first longitudinal end surface 52 and the second longitudinal end surface 53 of the transition sleeve 51. The first and second sleeve parts 58, 59 are joined by means of weld seams 60 (only one visible in the figure).

Even though FIGS. 6a-6c illustrates exemplifying embodiments wherein the transition sleeve is made of two sleeve parts, it is naturally also plausible that the transition sleeve may be made of more than two sleeve parts (such as three, four or more) each extending from the first longitudinal end surface to the second longitudinal end surface of the transition sleeve and together defining the rotational symmetrical shape of the transition sleeve. However, in order to minimise the work needed for providing the arrangement, it is preferred that the number of sleeve parts is two or possibly three in order to minimise the number of welds needed.

Figure 7:
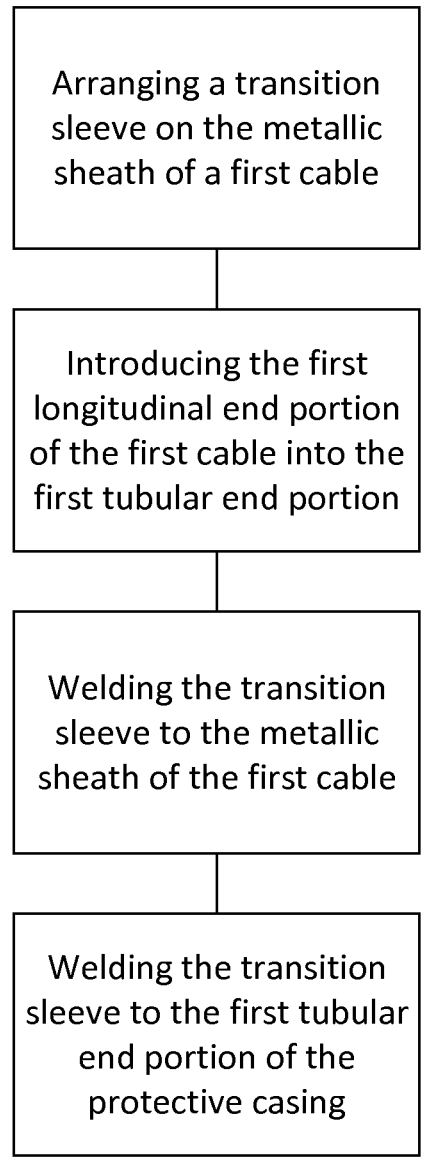
FIG. 7 schematically illustrates one exemplifying embodiment of a method for providing a joint, termination or cross-connection arrangement.

FIG. 7 schematically illustrates one exemplifying embodiment of a method for providing a joint arrangement for a cable, the joint arrangement comprising at least a first cable and a protective casing. The first cable comprises a metallic sheath and a first longitudinal end portion wherein the metallic sheath is exposed. The protective casing is essentially rotational symmetrical around a longitudinal axis and comprises a first tubular end portion coaxial with the longitudinal axis. The method comprises arranging a transition sleeve on the metallic sheath of the cable and thereafter introducing the first longitudinal end portion of the first cable into the first tubular end portion such that the first longitudinal end portion extends through the first tubular end portion. In such a position, the metallic sheath of the first cable may or may not extend through the first tubular end portion, but is at least present at the open end of the first tubular end portion. When the first longitudinal end portion of the first cable extends through the first tubular end portion of the protective casing, the transition sleeve is provided such as to be arranged coaxial with the longitudinal axis of the protective casing, and furthermore such that the first longitudinal end surface is longitudinally distanced from the first tubular end portion and the second longitudinal end surface is arranged radially inwards or radially outwards of the first tubular end portion. The transition sleeve is thus arranged such as shown in any one of FIGS. 2 to 5.

Thereafter, the transition sleeve is welded to the metallic sheath of the first cable around the whole circumference of the metallic sheath. The welding is performed at the first longitudinal end surface of the transition sleeve.

Thereafter, the transition sleeve is welded to the first tubular end portion of the protective casing around the whole circumference of the transition sleeve. Depending on the configuration of the transition sleeve, the welding of the transition sleeve to the protective casing may be performed at a second longitudinal end surface of the transition sleeve (compare with FIGS. 3 and 5) or at a circumferential outer surface of the transition sleeve (compare with FIGS. 2 and 4).

The method is not limited to the specific order of the steps as shown in FIG. 7. For example, the transition sleeve may be welded to the metallic sheath of the first cable before the first longitudinal end portion of the first cable is introduced into the first tubular end portion of the protective casing. The method may alternatively comprise introducing the first longitudinal end portion of the first cable into the protective casing and thereafter arranging the transitional sleeve on the metallic sheath of the first cable, followed by welding the transition sleeve to the metallic sheath and the first tubular end portion, respectively. According to yet another (however less preferred) alternative, the method may comprise welding the transition sleeve to the first tubular end portion followed by introducing the first longitudinal end portion of the first cable into the first tubular end portion of the protective casing, whereby the transition sleeve is arranged on the metallic sheath of the first cable, and thereafter weld the transition sleeve to the metallic sheath of the cable.

The following constitutes examples of plausible selections of materials of the constituent components of the joint arrangement according to the invention. Other examples are however also plausible and the examples shall therefore not be considered to constitute a limiting list of selection of materials of the constituent components.

EXAMPLE 1

A cable comprising a copper or copper based alloy sheath and a protective casing of stainless steel may be joined together as shown in any one of FIGS. 2 and 4 when the transition sleeve is made of nickel or a nickel based alloy.

EXAMPLE 2

A cable comprising a copper or copper based alloy sheath and a protective casing of stainless steel may be joined together as shown in any one of FIGS. 3 and 5, with a transition sleeve made of essentially the same material as the metallic sheath of the cable when the protective casing comprises a buffer coating of nickel.

EXAMPLE 3

A cable comprising a stainless steel sheath and a protective casing of stainless steel may be joined together according to any one of the above described exemplifying embodiments. The transition sleeve may in such case be made of stainless steel or of nickel or a nickel based alloy.

Even though the arrangement and method according to the present invention has been disclosed above with regard to a joint arrangement, such as a joint arrangement for joining two consecutive cables with the purpose to form a long cable, the arrangement and method is not limited thereto. It may likewise be used for a termination of a cable or for a cross-connection of cables.

The present invention is not limited to the specific embodiments disclosed above but may be varied within the scope of the appended claims. For example, the specific configuration of the protective casing is not essential to the invention as long as it comprises a first tubular end portion through which a cable can extend. Thus, the protective casing may for example comprise additional portions of various configurations without departing from the scope of the present invention. Furthermore, it should be noted that an arrangement according to the present invention may suitably comprise a protective casing comprising a first tubular end portion at the first longitudinal end as well as a second tubular end portion at the second longitudinal end, a first cable extending through the first tubular end portion and a second cable extending through the second tubular end portion, the first and second cables joined inside the protective casing such as to together forming a longer cable, and wherein at least at the first tubular end portion (but preferably also at the second tubular end portion), a transition sleeve is arranged as disclosed above in accordance with any one of the exemplified embodiments including as disclosed in any one of the appended independent claims. The arrangement of a transition sleeve at the first tubular end portion may or may not be the same as an arrangement of a transition sleeve at the second tubular end portion. For example, a transition sleeve at the first tubular end portion of the protective casing may be arranged as disclosed with reference to FIG. 2 and a transition sleeve at the second tubular end portion of the same protective casing may be arranged as disclosed with reference to FIG. 3.

The invention claimed is:

1. A joint, termination or cross-connection arrangement for a cable, comprising at least a first cable and a protective casing made of stainless steel,
    the first cable including a metallic sheath made of copper or a copper-based alloy, and a first longitudinal end portion wherein the metallic sheath is exposed,
    the protective casing being essentially rotationally symmetrical around a longitudinal axis (A) and including a first tubular end portion coaxial with the longitudinal axis (A) and through which the first longitudinal end portion of the first cable extends,
    the arrangement characterised in further including a rotationally symmetrical transition sleeve coaxial with the longitudinal axis (A) of the protective casing, the transition sleeve including a first longitudinal end surface and a second longitudinal end surface,
    wherein the transition sleeve, at the first longitudinal end surface thereof, is welded to the metallic sheath of the first cable around a whole circumference of the metallic sheath, and wherein the transition sleeve is further welded to the first tubular end portion of the protective casing around a whole circumference of the transition sleeve;

wherein the protective casing has a buffer coating that constitutes an outermost circumferential surface of the first tubular end portion welded to the transition sleeve, the buffer coating being made of nickel or a nickel-based alloy, and wherein the transition sleeve is made of copper or a copper-based alloy, or is made of nickel or a nickel-based alloy.

2. The arrangement according to claim 1, wherein the transition sleeve includes a first sleeve part extending from the first longitudinal end surface to the second longitudinal end surface of the transition sleeve, and an radially opposing second sleeve part extending from the first longitudinal end surface to the second longitudinal end surface of the transition sleeve.

3. The arrangement according to claim 1, wherein the transition sleeve includes a first rotationally symmetrical section having a first inner diameter and a second rotationally symmetrical section having a second inner diameter greater than the first inner diameter, the second rotationally symmetrical section of the transition sleeve including the second longitudinal end surface of the transition sleeve, and the transition sleeve is arranged such that the second rotationally symmetrical section thereof is at least partly provided radially outside of the first tubular end portion of the protective casing.

4. The arrangement according to claim 3, wherein the second longitudinal end surface of the transition sleeve is welded to said buffer coating.

5. The arrangement according to claim 3, wherein the transition sleeve is made of a same material as the metallic sheath of the first cable.

6. The arrangement according to claim 1, wherein the transition sleeve is arranged such that it is partly interposed between an inner surface of the first tubular end portion of the protective casing and the metallic sheath of the first cable, and such that the transition sleeve extends longitudinally outside of the protective casing.

7. The arrangement according to claim 1, wherein the metallic sheath of the first cable is a corrugated metallic sheath including peaks (p) and valleys (v), the peaks having a greater outer diameter than the valleys, and the first longitudinal end surface of the transition sleeve is welded to the metallic sheath of the first cable around the whole circumference of the metallic sheath at a peak (p) of the corrugated metallic sheath.

8. The arrangement according to claim 7, wherein at least a longitudinal part of an inner surface of the transition sleeve has a corrugated form conforming to an outer surface of the corrugated metallic sheath of the first cable.

9. A method of providing a joint, termination or cross-connection arrangement for a cable, the arrangement including at least a first cable and a protective casing made of stainless steel, the first cable including a metallic sheath made of copper or a copper-based alloy, and a first longitudinal end portion wherein the metallic sheath is exposed, the protective casing being essentially rotationally symmetrical around a longitudinal axis (A) and including a first tubular end portion coaxial with the longitudinal axis (A), the method including the steps of:

a) introducing the first longitudinal end portion of the first cable into the first tubular end portion of the protective casing such that the first longitudinal end portion extends through the first tubular end portion, b) arranging a rotationally symmetrical transition sleeve including a first longitudinal end surface and a second longitudinal end surface on the metallic sheath of the first cable such that when the first longitudinal end portion of the first cable extends through the first tubular end portion of the protective casing the transition sleeve is coaxial with the longitudinal axis (A) of the protective casing, the first longitudinal end surface is longitudinally distanced from the first tubular end portion, and the second longitudinal end surface is arranged radially inwards or radially outwards of the first tubular end portion, c) welding the transition sleeve, at the first longitudinal end surface thereof, to the metallic sheath of the first cable around a whole circumference of the metallic sheath, and d) either before or after step (c), welding the transition sleeve to the first tubular end portion of the protective casing around a whole circumference of the transition sleeve, wherein any one of steps (b)-(d) may be performed either before or after step (a), but at least one of step (c) and (d) is performed after both step (a) and step (b), wherein the protective casing has a buffer coating that constitutes an outermost circumferential surface of the first tubular end portion welded to the transition sleeve, the buffer coating being made of nickel or a nickel-based alloy, and wherein the transition sleeve is made of copper or a copper-based alloy, or is made of nickel or a nickel-based alloy.

10. The method according to claim 9, wherein step (b) includes providing a plurality of sleeve parts, assembling the sleeve parts so that the sleeve parts jointly define the rotationally symmetrical transition sleeve, and each sleeve part extends from the first longitudinal end surface to the second longitudinal end surface of the transition sleeve.

11. The method according to claim 9, wherein the transition sleeve includes a first rotationally symmetrical section having a first inner diameter and a second rotationally symmetrical section having a second inner diameter greater than the first inner diameter, the second rotationally symmetrical section of the transition sleeve including the second longitudinal end surface of the transition sleeve, and wherein the transition sleeve is arranged on the metallic sheath of the first cable such that, when the first longitudinal end portion of the first cable extends through the first tubular end portion of the protective casing, the second rotationally symmetrical section of the transition sleeve is at least partly provided radially outside of the first tubular end portion of the protective casing such that the second longitudinal end surface of the transition sleeve is arranged radially outside of the first tubular end portion of the protective casing.

12. The method according to claim 11, wherein welding the transitional sleeve to the first tubular end portion of the protective casing includes welding the second end surface of the transition sleeve to said buffer coating.

13. The method according to claim 11, wherein the transition sleeve is made of a same material as the metallic sheath of the first cable.

14. The method according to claim 9, wherein step (b) includes arranging the transition sleeve such that, when the first longitudinal end portion of the first cable extends through the first tubular end portion of the protective casing, the transition sleeve is partly interposed between an inner surface of the first tubular end portion of the protective casing and the metallic sheath of the first cable and the second longitudinal end surface of the transition sleeve is arranged radially inside of the first tubular end portion of the protective casing.

15. The method according to claim 9, wherein the metallic sheath of the first cable is a corrugated metallic sheath including alternating peaks (p) and valleys (v), the peaks having a greater outer diameter than the valleys, and wherein the welding of the first longitudinal end surface of the transition sleeve to the metallic sheath is performed such that a resulting weld seam is located at a peak of the corrugated metallic sheath of the first cable around the whole circumference of the metallic sheath of the first cable.

* * * * *